United States Patent [19]

Ngo

[11] 4,104,626

[45] Aug. 1, 1978

[54] ARRANGEMENT UTILIZING THE MECHANISM OF CHARGE SPREADING TO PROVIDE AN AC PLASMA PANEL WITH SHIFTING CAPABILITY

[75] Inventor: Peter Dinh-Tuan Ngo, Colts Neck, N.J.

[73] Assignee: Bell Telephone Laboratories, Incorporated, Murray Hill, N.J.

[21] Appl. No.: 767,143

[22] Filed: Feb. 9, 1977

[51] Int. Cl.[2] .................................... G06F 3/14

[52] U.S. Cl. .................................... 340/324 M; 313/188; 315/169 TV; 340/343

[58] Field of Search .............. 340/324 R, 324 M, 343; 313/188; 315/169 R, 169 TV

[56] References Cited

U.S. PATENT DOCUMENTS

| | | | |
|---|---|---|---|
| 3,719,940 | 3/1973 | Lay et al. | 340/324 M |
| 3,775,764 | 11/1973 | Gaur | 340/324 M |
| 3,781,599 | 12/1973 | Bonn | 315/169 TV |
| 3,792,301 | 2/1974 | Kessler | 313/188 |
| 3,795,908 | 3/1974 | McDowell et al. | 340/324 M |
| 3,839,713 | 10/1974 | Urade et al. | 340/324 M |
| 3,839,715 | 10/1974 | Andoh et al. | 340/324 M |
| 3,958,233 | 5/1976 | Schermerhorn | 340/324 M |
| 3,976,993 | 8/1976 | Hirose et al. | 340/324 M |

*Primary Examiner*—Marshall M. Curtis
*Attorney, Agent, or Firm*—Ronald D. Slusky

[57] ABSTRACT

Erase and "shifting write" pulses are applied across pairs of adjacent sites in each row of an ac plasma panel in a predetermined sequence. The shifting write pulse occurs during the conventional erase time period and its magnitude and duration are such that it will switch an OFF site on the ON state only if that site has received spread wall charge from an adjacent ON site. In addition, a scan erase pulse is used to temporarily lower the wall charge of certain ON sites when shifting is to be initiated, thereby preventing possible backshifting.

15 Claims, 5 Drawing Figures

FIG. 4

| SUSTAIN CYCLE / COLUMNS | 0 | 1 | 2 | 3 | 4 | 5 | 6 | 7 | 8 | 9 | 10 | 11 | 12 | 13 | 14 | 15 | 16 | 17 | 18 | 19 | 20 | 1 | 2 | 3 | 4 | 5 | 6 | 7 | 8 | 9 | 10 |
|---|---|---|---|---|---|---|---|---|---|---|---|---|---|---|---|---|---|---|---|---|---|---|---|---|---|---|---|---|---|---|---|
| C2 | | k | w | | | k | k | | | | e | k | w | | | k | e | | | | k | k | w | | | k | k | | | | e |
| C3, C7, ETC | | e | | | | | | | | | w | k | k | | | e | w | | | | k | e | | | | | | | | | w |
| C4, C8, ETC | | w | k | | | k | e | | | | | | | | | w | k | | | | e | w | k | | | k | e | | | | |
| C5, C9, ETC | se | k | k | | | e | w | | | | k | e | | | | | | | | | w | k | k | | | e | w | | | | k |
| C6, C10, ETC | | | | | | w | k | | | | e | w | k | | | k | e | | | | | | | | | w | k | | | | |
| FIG. 3 CHART | B | C | D | E | E | F | G | H | H | H | I | | | | | | | | | | | | | | | | | | | | |

se — SCAN ERASE PULSE
e — ERASE PULSE
w — SHIFTING WRITE PULSE
k — CANCELING PULSE

ARRANGEMENT UTILIZING THE MECHANISM OF CHARGE SPREADING TO PROVIDE AN AC PLASMA PANEL WITH SHIFTING CAPABILITY

BACKGROUND OF THE INVENTION

My invention relates to a method and arrangement for transferring, or shifting, information displayed on an ac plasma panel between adjacent discharge sites.

A plasma panel is a display device comprising a body of ionizable gas sealed within a nonconductive, usually transparent envelope. Alphanumerics, pictures, and other graphical data are displayed by controllably initiating glow discharges at selected locations within the display gas. This is accomplished by setting up electric fields within the gas via appropriately arranged electrodes, or conductors.

The invention more particularly relates to so-called twin-substrate ac plasma panels which have the conductors embedded within dielectric layers disposed on two opposing nonconductive surfaces, such as glass plates. Typically, the conductors are arranged in rows on one plate and columns orthogonal thereto on the other plate. The overlappings, or crosspoints, of the row and column conductors define a matrix of discharge sites, or cells. Glow discharges are created at selected crosspoints under the control of, for example, a digital computer. The computer initiates a discharge at a selected site by impressing, or applying, a "write" pulse thereacross via its row and column conductor pair. The magnitude of the write pulse exceeds the breakdown voltage of the gas, and a space charge, or plasma, of electrons and positive ions is created in the crosspoint region. Concomitant avalanche multiplication creates the glow discharge and an accompanying short, e.g., one microsecond, light pulse in the visible spectrum. The write pulse, which continues to be applied across the site, pulls at least some of the space charge electrons and ions, or charge carriers, to opposite cell walls, i.e., opposing dielectric surfaces in the crosspoint region. When the write pulse terminates, a "wall" voltage resulting from these so-called wall charges remains stored across the gas at the crosspoint.

A single short-duration light pulse cannot, of course, be detected by the human eye. In order to provide a plasma discharge site with the appearance of being continuously light-emitting (ON, energized), further rapidly successive light pulses are needed. These are generated by a "sustain" signal which is impressed across each site of the panel. The sustain signal may comprise, for example, a train of alternating-polarity pulses. The magnitude of these sustain pulses is less than the gas breakdown voltage. Thus, the voltage across sites not previously energized by a write pulse is insufficient to cause a discharge and those sites remain in non-light-emitting states.

The voltage across the gas of a site which has received a write pulse, however, comprises the superposition of the sustain signal voltage with the wall voltage previously stored at that site. Conventionally, the sustain pulse which follows a write pulse has a polarity opposite thereto so that the wall and sustain voltages combine additively across the gas. This combined voltage exceeds the gas breakdown voltage and a second glow discharge and accompanying light pulse are created. The flow of carriers establishes an opposite wall voltage polarity. The polarity of the next sustain pulse is also opposite to that of its predecessor, creating yet another discharge, and so forth. After several sustain cycles, the magnitude of the wall voltage is established at a nominally constant, characteristic level which is a function of the gas composition, panel geometry, sustain voltage level, and other parameters. The sustain signal frequency may be on the order of 40–50 kHz so that the light pulses emitted by an ON site in response to the sustain signal are fused by the eye of the viewer, and the cell appears to be continusously light-emitting.

A site which has been established in a light-emitting state is switched to a non-light-emitting (OFF, de-energized) state via the application of an "erase" pulse thereacross, which creates one last discharge but removes the stored wall charge.

In the past, write (and other) pulses have been impressed across a gas discharge display site principally by utilizing so-called half-select techniques in which opposite-polarity signals, each of nominally half the write pulse magnitude are applied to the row and column conductors, respectively, of the site in question. These half-select signals are, of course, also thereby extended to each other site in the row and column of the selected site. Since they combine only across the selected site, however, only that site receives a full magnitude write pulse and only that site switches to the ON state.

Disadvantageously, half-select writing (and erasing) requires an individual driver circuit for each row conductor and each column conductor. Each driver circuit, in turn, typically comprises a number of active and passive components. Since a plasma panel may have, for example, 512 row conductors and an equal number of column conductors, the requirement of a driver for each conductor substantially increases the cost, complexity and bulk of the display panel. Accordingly, numerous arrangements have been proposed to minimize the amount of circuitry required to drive an ac plasma panel. Among these are so-called shifting displays in which the display information for each site in a given row, for example, is entered at one end of the row and is thereafter shifted to the proper column location by applying specially-adapted shifting voltage waveforms to the column conductors. Typically, every third or fourth column conductor is connected to a common bus (depending on the specific shifting technique employed) so that only four or five column drivers are required - one for writing and three or four for shifting. Unfortunately, however, the shifting arrangements known in the art each suffer from one or more significant drawbacks, including severe signal margin requirements, low shifting speed, poor resolution, limited viewing angle and complex, expensive panel structure.

SUMMARY OF THE INVENTION

The present invention overcomes these and other limitations of the prior art arrangements. In accordance with an important feature of the invention, I have discovered that the state of a first, "display" site can be shifted to a second, adjacent "shift" site by applying a conventional erase pulse across the display site in the normal erase time period i.e., after a sustain pulse of the opposite polarity, and applying a shifting write pulse across the adjacent shift site within that same erase period. The magnitude and duration of the shifting write pulse are such that the pulse is insufficient by itself to switch an OFF site to the ON state. Thus, if the display site is initially OFF, the shift site remains OFF, as desired.

On the other hand, if the display site is ON, a portion of the wall charge created by the last sustain-initiated discharge will have spread to the shift site by the time the shifting write pulse is applied across the latter site. The polarity of the spread charge is such that the voltage created thereby combines additively with the shifting write pulse and the two together, aided by dynamic priming due to the erase discharge, are sufficient to create an initial discharge at the shift site. The shifting write pulse is sufficiently proximate to the following sustain pulse to ensure that the shift site switches to the ON state in response to this initial discharge. Since the now-erased, shift site was initially ON, its state is thus seen to have been transferred to the display site.

In an illustrative embodiment of a plasma display system embodying the above-described feature of the invention, both the row and column conductors of the display panel are regularly spaced at conventional distances from one another, e.g., 60/inch, with display and shift sites alternating along each row. With this arrangement, a potential problem arises if a particular display site is OFF while the next display site is in the direction of shift (separated therefrom by a shift site) is ON. Charge from this second display site spreads not only in the direction of shift to its associated shift site, but also back to the first shift site, i.e., that associated with the first display site. Thus, when the shifting write pulse is applied across the first shift site, that site would be incorrectly switched to an ON state.

This potential problem is avoided in accordance with another feature of the invention by temporarily depleting the wall charge of the second display site, prior to the shifting write pulse utilizing, for example, the scan erase pulse disclosed in my U.S. Pat. No. 3,851,327 issued Nov. 26, 1974. With the wall charge of the second display site depeleted, any charge which spreads therefrom to the first shift site insufficiently augments the shifting write pulse to switch the first shift site to the ON state. The wall voltage of the second display site builds up to its characteristic level over one or more succeeding sustain cycles so that the state of the second display site can be thereafter transferred to its associated shift site, as will now be described.

Shifting the states of an entire row of plasma display sites in accordance with the above-described principles of the invention illustratively proceeds in a number of steps. First, the wall charge of the sites of each even-numbered display site is partially depeleted, utilizing the above-mentioned scan erase pulse. In the next sustain cycle, an erase pulse is applied across each odd-numbered display site followed by the application of a shifting write pulse across their associated shift sites. After one or more sustain cycles, the wall voltage at the even-numbered display sites automatically builds back up to its characteristic level. Erase and shifting write pulses are then applied across the even-numbered display sites and their associated shift sites, respectively. A scan erase pulse is not needed for this latter phase of the shifting operation because the nearest site from which charge might be erroneously spread to any shift site is at least two sites away, and the amount of charge which spreads from an ON site to one which is at least two sites away is sufficiently small that it does not enable a shifting write pulse to switch an OFF site to the ON state.

The characterization of particular sites of a row as being either "display" or "shift" sites is arbitrary. Thus in the next shifting operation, the display sites become shift sites and vice versa. Advantageously, the shifting write pulse parameters may be chosen such that the wall voltage of a site switched to the ON state by the shifting write pulse is initially at a low, or depleted, level. This means that when the display information is shifted across the panel in a continuous manner, a scan erase pulse is required only prior to the first shifting operation, its function being automatically performed thereafter.

The information in any two, three or more rows of a plasma panel can be shifted across the panel concurrently in accordance with the present invention by simply applying the above-described sequence of signals to the sites in the desired rows. A potential problem which arises in such a multi-row arrangement is that charge from one or more ON sites in one row may spread to a shift site in a neighboring row, thereby causing the shift site to switch to the ON state even if its associated display site is OFF. This is avoided in accordance with another feature of the invention by presenting display information in rows defined by alternate "display" row conductors of the panel. The other, "barrier" row conductors may be left at a floating potential or, in preferred embodiments of the invention, may be energized by a novel "barrier" waveform. The barrier waveform is similar in shape to the wall voltage of an ON site but may be of lower amplitude. This technique, I have found, prevents charge spreading between adjacent display rows.

BRIEF DESCRIPTION OF THE DRAWING

The invention may be clearly understood from a consideration of the following detailed description and accompanying drawing in which

FIG. 4 is a chart showing the shifting signal sequence utilized in the display system of FIG. 1.

DETAILED DESCRIPTION

Figure 1:
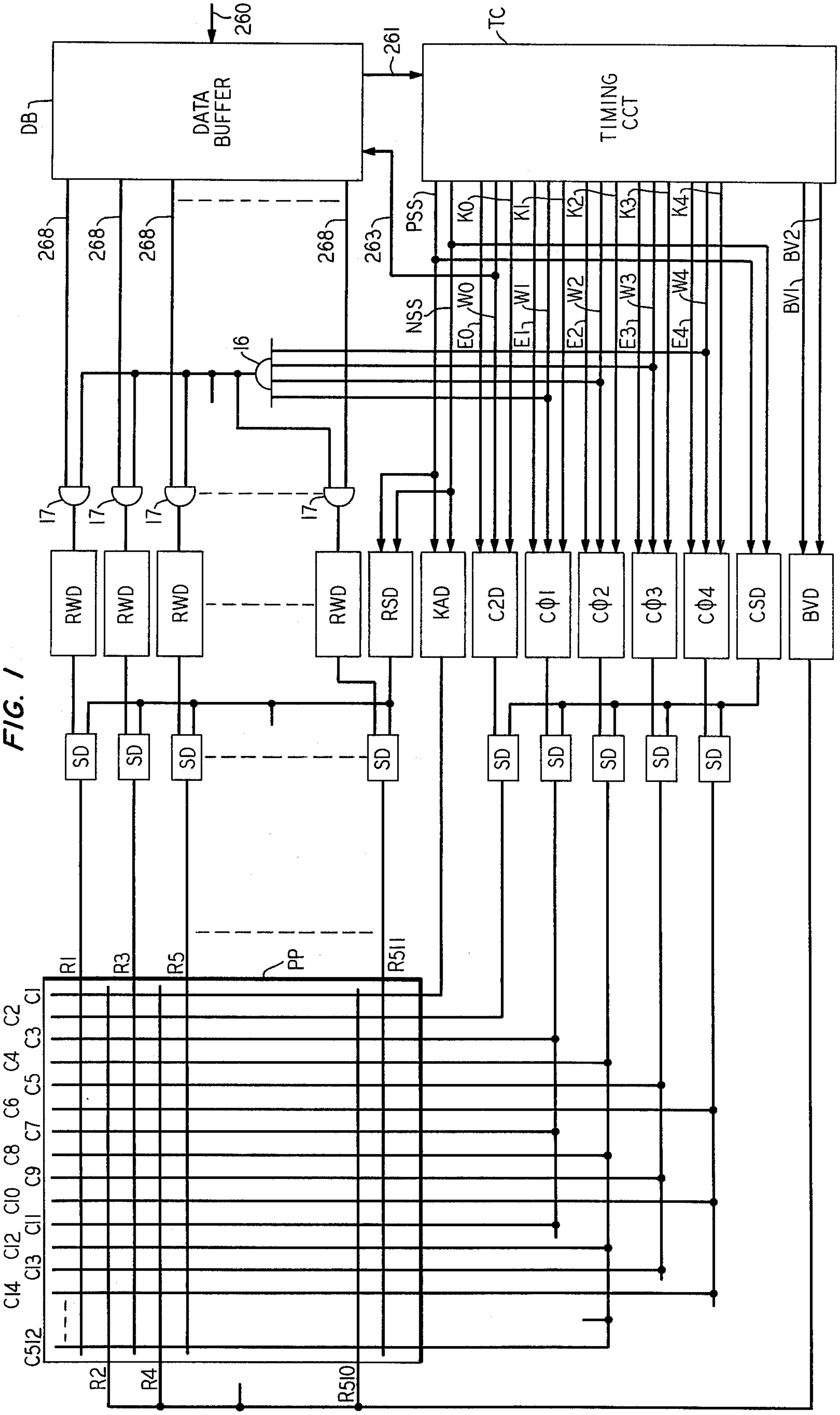
FIG. 1 depicts a shifting plasma display system embodying the principles of the present invention.

FIG. 1 depicts a display system at the heart of which is a twin-substrate ac plasma panel PP. Panel PP is illustratively comprised of two glass plates between which an ionizable gas mixture is sealed. The inner surface of each glass plate is covered by a dielectric layer. A first set of 512 "column" conductors C1-C512 is embedded in one of the dielectric layers in a generally vertical direction. A second set of 511 "row" conductors R1-R511 is embedded in the other dielectric layer in a generally horizontal direction. The conductors of each set are spaced very closely together at, for example, 60 lines per inch. The individual regions of panel PP defined by the overlappings or crosspoints, of the various row and column conductors function as its display cells, or sites. Visual data are presented on the panel by creating glow discharges in the gas at selected crosspoints. Panel PP is illustratively of the general type disclosed in B. W. Byrum et al, U.S. Pat. No. 3,823,394, issued July 9, 1974, which is hereby incorporated by reference.

Figure 2:
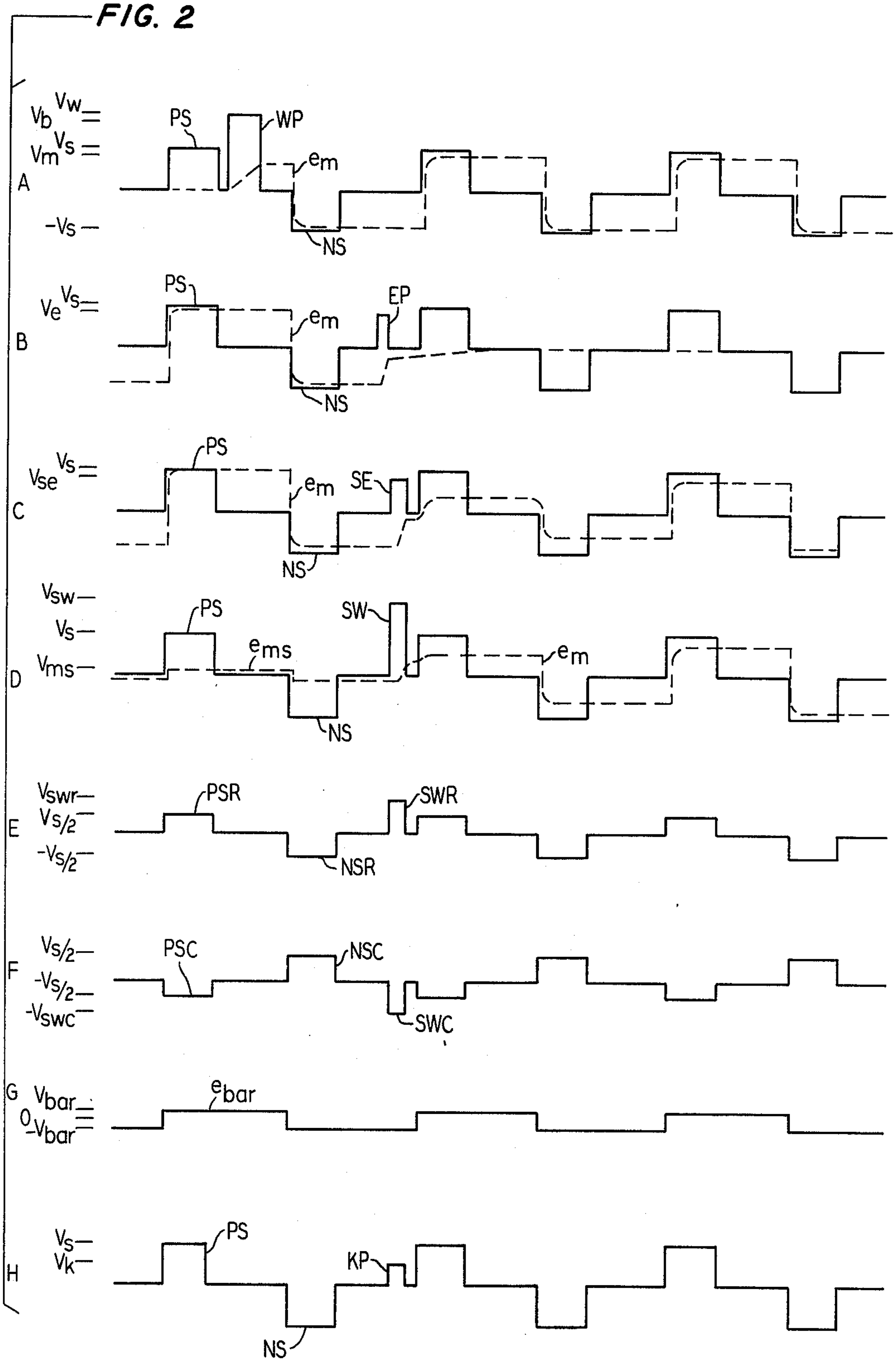
FIG. 2 depicts several signal waveforms utilized in the display system of FIG. 1, including the novel shifting write pulse and barrier voltage waveform of the present invention.

Waveform A of FIG. 2 depicts a conventional write pulse WP. Most conventional ac plasma panel systems use this pulse, or one similar to it, to switch OFF sites to the ON state. Illustratively, this pulse is not used in the display system of FIG. 1. Rather, the novel shifting write pulse of the present invention is used to switch OFF sites to the ON state. However, the following discussion of the characteristics and operation of pulse WP will be found helpful in understanding some of the basic principles of ac plasma panel operation.

Write pulse WP is applied across a particular display site of an ac plasma panel via the row and column conductor pair associated with that site. The magnitude $V_w$ of pulse WP, illustratively 150 volts, exceeds the breakdown voltage $V_b$ of the display gas and is thus sufficient to create an initial glow discharge in the gas in the immediate vicinity of the selected display site. The glow discharge is characterized by (a) a short, e.g. one microsecond, light pulse in the visible spectrum and (b) the creation of a space cloud, or plasma, of electrons and positive ions near the site. Pulse WP pulls at least some of these charge carriers to opposite walls of the display site, i.e., respective regions of the opposing dielectric surfaces near the crosspoint. Even when pulse WP terminates after, for example 3.0 μsec, a "wall" voltage $e_m$ remains stored across the gas in the crosspoint region. This wall voltage plays an important role in the subsequent operation of the panel, as will be seen shortly.

A single short duration light pulse cannot, of course, be detected by the human eye. In order to provide a discharge site of an ac plasma panel with the appearance of being continuously light-emitting (ON, energized), further rapidly successive glow discharges and accompanying light pulses are needed. These are generated by a sustain signal which is impressed across each cell of the panel via its conductor pair. As indicated in waveform A, the sustain signal illustratively comprises a train of alternating positive- and negative-polarity sustain pulses PS and NS, respectively, which are illustratively of 5.0 μsec duration. The magnitude $V_s$ of these sustain pulses, illustratively 98 volts, is less than the breakdown voltage $V_b$. Thus the voltage across display sites not previously energized by a write pulse, or as will be discussed, a shifting write pulse, is insufficient to cause a discharge and those sites remain non-light-emitting. (The "dead time" between the end of pulse PS and the beginning of pulse NS is illustratively 7.0 μsec, and that between the end of pulse NS and the beginning of the following pulse PS is illustratively 8.0 μsec. These time intervals may, of course, be longer or shorter, depending on the application.)

However, the voltage across the gas of a previously-energized display site comprises the superposition of the sustain voltage with the wall voltage $e_m$ previously stored at that cell. In particular, the wall voltage created by write pulse WP, for example, combines additively with the following negative sustain pulse NS. This combined voltage exceeds $V_b$ so that a second glow discharge and accompanying light pulse occur. The flow of carriers to the walls of the display site now establishes a wall voltage of negative polarity. Thus the following, positive sustain pulse PS creates another discharge and wall voltage reversal, and so forth.

After several sustain cycles, the magnitude of wall voltage $e_m$ reaches a constant, characteristic level $V_m$. The sustain signal frequency may be on the order of 40–50 kHz. Thus, the light pulses created in response to each sustain pulse are fused by the eye of the viewer and the display site appears to be continuously light-emitting.

Figure 3:
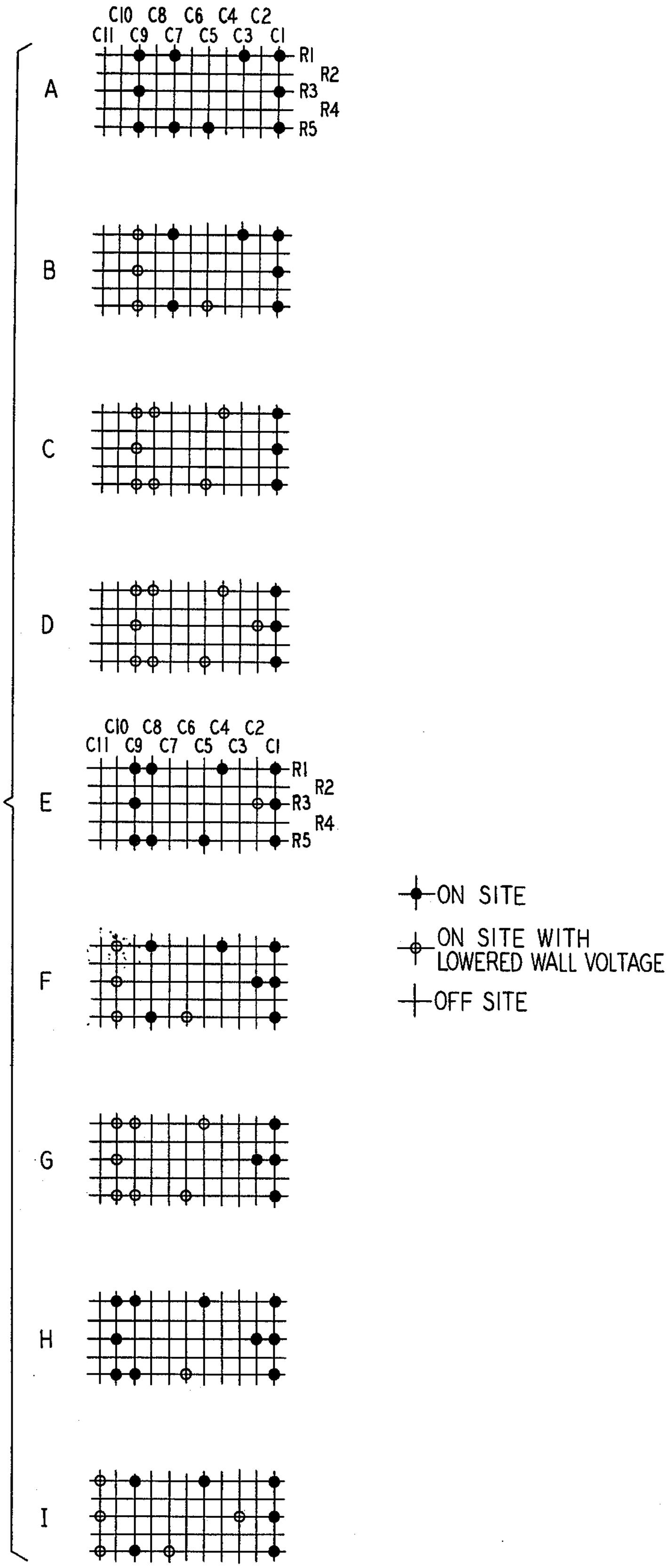
FIG. 3 depicts a site state shifting sequence helpful in explaining the principles of the present invention.

The signals in waveforms B-H of FIG. 2 are all used in the display system of FIG. 3. In particular, a plasma display site already in a light-emitting state is switched to a non-light-emitting (OFF, de-energized) state by removing its wall charge. This is accomplished by an erase pulse, such as pulse EP shown in waveform B of FIG. 2. Again, this pulse is applied across a particular site by way of its row and column conductor pair. The magnitude of pulse EP is $V_e > (V_b - V_m)$. Since positive pulse EP follows a negative sustain pulse NS, the former causes a discharge at an ON cell, just as the latter would have. Wall voltage $e_m$ begins to reverse polarity. However, erase pulse EP is of such short duration relative to a sustain pulse that the wall voltage reversal is terminated prematurely. In particular, it is terminated at a time when the wall voltage is less than the minimum necessary to foster further discharges. The display site is thus returned to a non-light-emitting state. Any residuum of wall voltage $e_m$ eventually disappears due to recombination of the positive and negative charge carriers and diffusion thereof away from the display site. A typical erase pulse may have a magnitude of 78 volts and duration of 1.0 μsec, and may terminate, for example, 3.0 μsec prior to the onset of the following sustain pulse. Erase pulse EP in the present illustrative embodiment is given a somewhat-lower-than-usual magnitude, e.g., 70 volts, as is explained hereinbelow.

Waveform C of FIG. 2 illustrates a so-called "scan erase" pulse SE. As is disclosed, for example in my U.S. Pat. No. 3,851,327, issued Nov. 26, 1974, which is hereby incorporated by reference, this pulse is similar to a conventional erase pulse in that it depletes the wall voltage of an ON site. However, the scan erase pulse terminates a sufficiently short time prior to the onset of the following, positive sustain pulse PS that as a result of several mechanisms, the wall voltage builds back up to $V_m$ over several succeeding sustain cycles. Heretofore, scan erase pulses have been used principally in light pen detection schemes for ac plasma panels. However, the concept of wall voltage depletion followed by a gradual return to $V_m$ also figures significantly in the shifting technique of the present invention, as will be seen shortly. The magnitude of pulse SE is illustratively 78 volts. Its duration may be, for example 1.5 μsec and it illustratively terminates 1.0 μsec prior to the initiation of the following, positive sustain pulse.

Waveform D of FIG. 2 illustrates an important feature of the present invention—shifting write pulse SW. It is assumed in waveform D that the display site to which pulse SW is applied is OFF, but that an immediately adjacent site is ON. Since there are no physical barriers between display sites, some of the charge stored at the adjacent ON site in response to each sustain pulse leaks, or "spreads," to its OFF neighbor. (See, for example, the discussion in my paper, "Charge Spreading and Its Effect on AC Plasma Panel Operating Margins," Conference Record of 1976 Biennial Display Conference, pp. 118–120.) As indicated in waveform D, this creates an alternating polarity spread wall voltage waveform $e_{ms}$ at the OFF site in question. The magnitude $V_{ms}$ of the spread wall voltage is sufficiently low, e.g. 7 volts, that its presence does not affect the OFF state of the site. That is, $V_{ms} < (V_b - V_s)$.

However, since shifting write pulse SW occurs (unconventionally for a write pulse of any kind) after a sustain pulse of the opposite polarity, pulse SW combines additively with the spread wall voltage $e_{ms}$. The magnitude $V_{sw}$ and duration of pulse SW, illustratively 153 volts and 1.5 μsec, respectively, are such that its combination with the charge spread from the neighboring ON site, aided by dynamic priming when, as will be seen, the adjacent site is erased, is sufficient to create an initial discharge at the site receiving the shifting write pulse. In addition, pulse SW terminates within the so-called "recovery time" associated with a pulse of its magnitude, duration and polarity. That is, the termination point of pulse SW is sufficiently proximate, illustratively 1.0 μsec, to the following positive-polarity sustain pulse that, as in the case of scan erase pulse SE, enough wall voltage is initially stored at the site to enable it to build up to $V_m$ over the succeeding several sustain cycles. The site is thus switched to the ON state. At the same time, the magnitude of shifting write pulse SW is chosen such that that pulse is insufficient to switch an OFF site to the ON state except when augmented by spread charge, as just described. Thus, if the neighboring sites are also OFF, pulse SW has no affect on an OFF site.

If desired, the negative sustain pulse preceding pulse SW can be made somewhat, e.g., 10 volts, larger than usual. This increases the wall voltage stored at the adjacent ON site and thus the amount of charge spread to the site in question. The increased spread charge, in turn, advantageously expands the range of allowable values for $V_{sw}$, i.e., the signal "margin" of pulse SW.

With the above discussion in mind, consider now Chart A of FIG. 3 which depicts the upper right-hand corner of panel PP. The portion of the panel depicted is comprised of 55 discharge sites defined by the intersections of row conductors R1-R5 and column conductors C1-C11. For convenience, the rows and columns of the sites themselves will also be herein referred to as R1-R5 and C1-C11, and each discharge site will be identified by its row and column coordinates. For example, the site at the intersection of row R1 and column C9 is site (1,9). Information is illustratively displayed on panel PP at sites located in odd-numbered rows and when the display system is in its "display," as opposed to "shifting," mode, in the odd-numbered columns, as depicted in Chart A.

Ignore columns C1 and C2 for the moment. The displayed pattern of ON and OFF sites in columns C3-C11 of Chart A is shifted one column to the left (in this example) by first transferring the states of the "display" sites in columns C3 and C7 along their respective rows to the "shift" sites in columns C4 and C8, respectively. The states of sites in columns C5 and C9 are then transferred along their respective rows to columns C6 and C10. The pattern may be shifted as far to the left as desired by repeating this two-step process. FIG. 4 shows the sequence of signals applied to the display sites in each column of the panel to achieve the above shifting sequence.

In particular, as indicated in FIG. 4, shifting is begun in an arbitrarily selected cycle of the sustain signal waveform, sustain cycle O, by applying a scan erase pulse such as pulse SE across the sites in columns C5 and C9, thereby reducing the wall voltage of ON sites in those columns, as is shown in Chart B of FIG. 3 and waveform C of FIG. 2. The reason for this is to prevent "backshifting", as will be explained shortly. An erase pulse is then applied across the sites in columns C3 and C7 during sustain cycle 1, followed immediately in the same sustain cycle by the application of a shifting write pulse across the sites of columns C4 and C8. Since sites (1,3), (1,7) and (5,7) were in the ON state prior to receiving the erase pulse, charge previously stored at each of them has spread to sites (1,4), (1,8) and (5,8), respectively. The shifting write pulse applied across the sites of columns C4 and C8 is thus augmented sufficiently to switch sites (1,4), (1,8) and (5,8) to the ON state. Since sites (1,3), (1,7) and (5,7) were just erased, their ON states have been shifted one column to the left, as seen in Chart C. Chart C (as well as waveform D of FIG. 2) also shows that, illustratively, the wall voltage of sites (1,4), (1,8) and (5,8) is initially at a low, or depleted level.

Referring back to Chart A, it will be recalled that sites (3,3), (3,7) and (5,3) were initially OFF. Thus, any charge which has spread to their immediate left neighbors — sites (3,4), (3,8) and (5,4) — must be quite small. Otherwise, the shifting write pulse applied across the sites in columns C4 and C8 may, incorrectly, switch one or more of sites (3,4), (3,8) and (5,4) to the ON state. There is, in fact, a problem here. Note, for example, from Chart A that just prior to the application of the shifting write pulse across the sites in columns C4 and C8, five sites in the vicinity of site (3,8) are in the ON state. Unless charge is prevented from spreading to site (3,8) from these five ON sites, site (3,8) is likely to be switched, incorrectly, to the ON state in response to that shifting write pulse.

This undesired charge spreading is avoided in accordance with the invention in two ways. Firstly, charge is prevented from spreading between adjacent rows of sites by applying a "barrier" signal $e_{bar}$ to conductors R2 and R4. As shown in waveform G of FIG. 2, barrier signal $e_{bar}$ is similar in shape to the wall voltage waveform of an ON site, but can be of lower magnitude $V_{bar} \approx 30$ volts. I have discovered that this signal waveform prevents most charge spreading in the direction perpendicular to the barrier conductor to which it is applied, since it tends to push any charge carriers which might spread toward a display row electrode, i.e., R1, R3 and/or R5, back where they came from. Thus, only a small amount of charge spreads to any site in a given row from an ON site in another row, preventing "cross-talk" between the display rows. I have also discovered that there is some reduction in charge spreading when the barrier conductors are simply allowed to "float" with no signal or fixed potential being applied to them. Thus, if desired, barrier signal $e_{bar}$ need not be used although, disadvantageously, the lack of a barrier signal will somewhat reduce the range of allowable values for $V_{sw}$, i.e., the signal margin for pulse SW.

Note further, however, that an OFF site receives the same amount of spread charge from an ON cell immediately to its left as it does from an ON cell immediately to its right. This would cause sites (3,8) and (5,4), for example, to be improperly switched to the ON state in response to charge spread thereto from sites (3,9) and (5,5), respectively. The barrier signal on conductors R2 and R4 is of no help here. Recall, however, that a scan erase pulse was applied across the sites in column C5 and C9 prior to the erase pulse applied across the sites in columns C3 and C7. As shown in waveform C of FIG. 2, and as graphically depicted in Chart B of FIG. 3, the scan erase pulse lowers the wall voltage of an ON cell for a number of sustain cycles. Here, the lowered wall voltage of sites (3,9) and (5,5) means that the amount of charge spread to sites (3,8) and (5,4) is proportionately lowered and, in fact, is less than the minimum needed by a shifting write pulse to switch a site ON. Accordingly, sites (3,8) and (5,4) remain OFF as, of course, does site (3,4).

Ignoring, for the moment, the signals of sustain cycle 2, FIG. 4 shows that three sustain cycles are now allowed to elapse to enable all the ON cells of the display, shown depleted in Charts C and D of FIG. 3, to recover their full wall voltages, as is shown in Chart E. (Fewer than three cycles may be allowed to elapse if, in a particular application, the wall voltage is assumed to have recovered sooner.) Thereafter, in sustain cycle 5, an erase pulse is applied across the sites in columns C5 and C9 followed in that same cycle by a shifting write pulse applied across the sites in columns C6 and C10. This results in the pattern shown in Chart F. I have discovered that the amount of charge which spreads from an ON site to a second-nearest neighbor is very much less than that which spreads to a nearest neighbor. Accordingly, the magnitude of the shifting write pulse SW can be chosen such that an OFF site switches to the ON state in response to pulse SW only if its immediate neighbor is ON. In this example, then, site (1,6) remains OFF notwithstanding the ON state of sites (1,4) and (1,8).

The pattern of Chart F will be recognized as being the same as that of Chart B shifted one column to the left (again ignoring columns C1 and C2). If shifting is terminated at this time, the wall voltage of sites (1,10), (3,10), (5,6) and (5,10) will return to $V_m$ after several sustain cycles. The pattern would then be precisely that of Chart A shifted one column to the left.

If there is to be further shifting, however, it can proceed from the configuration of Chart F, with the sites in each column receiving the pulse sequence previously received by the sites one column to the right. Since the ON sites in columns C6 and C10 already have low wall voltages — which can be assured by establishing the time interval between the termination of pulse SW and the following sustain pulse at, or just a little less than, the above-discussed recovery time — it is not necessary to first apply a scan erase pulse across them. Rather, the shifting sequence can continue in sustain cycle 6 with the application of an erase pulse across the sites of columns C4 and C8 and a shifting write pulse across the sites of columns C5 and C9. Charts G-I of FIG. 3 show the display pattern as it shifts through sustain cycles 7, 8, 9 and 10; FIG. 4 shows the signals utilized to provide shifting through these cycles and then another ten cycles, i.e., to sustain cycle 20. Thereafter, the pattern of signals applied to each column repeats, with the exclusion of the scan erase pulse of cycle 0. That pulse is used only if the shifting sequence of cycles 1–20 is interrupted and it is necessary to deplete the wall voltage of some ON sites before proceeding.

A typical mode of operating a shifting display system involves shifting new information onto the panel as the information already presented thereon is shifted further across the panel. In the illustrative display system of FIG. 1, this is achieved as follows: Referring again to Charts A-I of FIG. 3, it will be noted that the display sites in column C1 are continously ON. Accordingly, spread charge sufficient to switch a site to the ON state in response to a shifting write pulse is always present at the display sites of column C2. Thus, for example, assume that it is desired to establish the sites in rows R1, R3 and R5 of the next available display column in the OFF, ON and OFF states, respectively. This is illustratively accomplished by applying a shifting write pulse across site (3,2) during sustain cycle 2, when no other shifting operation is occurring. The states of the display sites in column C2 are thereafter transferred to column C3 by applying an erase pulse and a shifting write pulse in that order to columns C2 and C3, respectively, during sustain cycle 10. A second shifting write/erase pair for the sites of column C2 is illustratively provided during sustain cycles 12 and 16, respectively, of each twenty-cycle sustain block, with a shifting write signal being applied to the sites of column C3 during cycle 16.

The most straightforward way of applying the above-described waveforms to a site of panel PP would be to apply the entire signal to its column conductor, for example, while holding its row conductor at ground potential. However, this is not a practical approach for generating shifting write pulse SW because it requires relatively large power supplies and introduces unacceptably high capacitive coupling between adjacent conductors. Accordingly, shifting write pulses (as well as sustain pulses) are applied to a display site of panel PP on a half-select basis in which opposite-polarity portions of the signal are applied to the row and column conductors of the site. For example, half-select portions of waveform D of FIG. 2 are shown in waveforms E and F, respectively, with the row and column half-select portions of pulse SW being positive pulse SWR and negative pulse SWC, respectively. The row and column components of pulse PS are PSR and PSC; those of pulse NS are NSR and NSC.

Advantageously, half-select pulse SWR, when applied to a particular row conductor during a particular sustain cycle, re-enforces the erasing action of the erase pulse applied to sites of that row during that sustain cycle. This is so particularly when pulse SWR closely follows the erase pulse. This allows the erase pulse to be of somewhat lower amplitude, e.g., 70 volts, than would otherwise be the case. The use of a lowered erase pulse amplitude, in turn, is advantageous from several standpoints.

First of all, it means that the discharge created by the erase pulse extends over a smaller region in the vicinity of the erased site, thereby minimizing the erasure of what would otherwise be effective as spread charge in the vicinity of the adjacent site receiving the shifting write pulse. This advantageously expands the allowable range of values for $V_{sw}$, i.e., improves the shifting write pulse margin. In addition, a lowered erase pulse magnitude means that the discharge created by the erase pulse is somewhat delayed and is of lesser intensity than a discharge created by a conventional erase pulse. This leads to improved dynamic gas priming for the shifting write pulse at the adjacent site while priming other sites of the display to a much lesser extend, further improving the shifting write pulse margin.

The magnitude $V_{swr}$ of pulse SWR is illustratively the same as that of erase pulse EP, i.e., 70 volts. The magnitude of $V_{swc}$ of its negative, column counterpart, pulse SWC, is 83 volts, providing a total shifting write pulse magnitude $V_{sw}$ of 153 volts. Pulse SWC is also used by itself in the illustrative embodiment of FIG. 1 as scan erase pulse SE of waveform C, FIG. 2. Note, in this regard, that since negative-polarity pulse SWC is applied to a column conductor, it provides a positive (row-to-column) scan erase pulse across the site, as desired.

Unfortunately, it is possible for half-select pulse SWR to erase a site even in the absence of a preceding erase pulse. Thus referring, for example, to Chart E of FIG.

3, it will be seen that when a shifting write pulse SW is applied to columns C6 and C10, its half-select component SWR on row conductors R1-R5 may incorrectly switch sites (1,4), (1,8), (3,2) and (5,8) to the OFF state. In accordance with an aspect of the invention, this problem is avoided by applying a canceling pulse KP, shown in waveform H of FIG. 2, to each column conductor which might have one more sites ON but which is not receiving a shifting write pulse. Pulse KP is of the same polarity and occurs in the same time period as pulse SWR. The two thus combine subtractively across a site. The canceling pulse magnitude $V_k$ need only be sufficient to reduce the overall voltage across a site receiving pulse SWR to a level below that which will erase an ON site. (That is, $V_k > (V_m + V_{swr} - V_b)$. The magnitude of pulse $V_k$ is illustratively 32 volts. The sites needing a canceling pulse during each sustain cycle are indicated in FIG. 4.

More particular reference is now made to the display system FIG. 1 which, in addition to panel PP, includes timing circuit TC, data buffer DB, row and column sustain drivers RSD and CSD, respectively, row write drivers RWD, column C2 driver C2D, barrier voltage driver BVD, keep-alive driver KAD, column shift drivers Cϕ1, Cϕ2, Cϕ3 and Cϕ4, and steering diode, i.e., OR, gates SD. The above-mentioned drivers may all be similar to the type disclosed, for example, in E. P. Auger U.S. Pat. No. 3,754,230 issued Aug. 21, 1973. Data buffer DB may be similar to that shown, for example, in FIGS. 9–10 of N. H. Stockel U.S. Pat. No. 3,292,156 issued Dec. 13, 1966.

Timing circuit TC generates signals on leads PSS and NSS defining the time slots in which positive and negative sustain pulses, respectively, are to be applied to the display sites in the odd-numbered rows of panel PP. Responsive to those signals, sustain drivers RSD and CSD apply opposite-polarity half-select portions of the sustain pulses to the column conductors and the odd-numbered row conductors of the panel through respective ones of gates SD. The signals on leads PSS and NSS are also extended to driver KAD. In response, driver KAD applies to column conductor C1 a signal which is similar to column sustain half-select waveform F but which is of somewhat greater amplitude. This signal maintains the display sites of column C1, i.e., those in the odd-numbered rows, in the ON state at all times to provide spread charge at the sites of column C2, as previously described. In addition, timing circuit TC generates signals on leads BV1 and BV2 defining the time slots during which the positive- and negative-polarity portions, respectively, of barrier signal $e_{bar}$ are to be applied to the even-numbered rows of the panel. The barrier signal itself is generated by driver BVD in response to the signals on leads BV1 and BV2.

Beginning with column C3, every fourth column of panel PP receives the same pulse train. To this end, timing circuit TC generates logic level signals on leads E1, W1 and K1 defining the times during each block of twenty sustain cycles when erase, shifting write and canceling pulses, respectively, are to be applied across the sites in columns C3, C7, C11 etc. Column driver Cϕ1 responds to each signal on leads E1, W1 and K1 to generate an erase pulse EP, the negative half-select portion SWC of a shifting write pulse and a canceling pulse KP, respectively. These pulses are extended from driver Cϕ1 to column conductors C3, C7, C11, etc. by way of its associated steering diode gate SD.

Similarly, conductors C4, C8, C12, etc. receive the output of driver Cϕ2, while conductors C5, C9, C13, etc. receive the output of driver Cϕ3 and conductors C6, C10, C14, etc. receive the output of driver Cϕ4. The signals received and the pulses generated by drivers Cϕ2, Cϕ3 and Cϕ4 are the same as those of driver Cϕ1, but each delayed five sustain cycles with respect to the previous one, as is indicated by the dashed lines in FIG. 4.

In a similar manner, conductor C2 receives its erase, shifting write half-select and canceling pulses from driver C2D which, in turn, is responsive to logic level signals on leads EO, WO and KO.

As previously mentioned, the only signal applied to the even-numbered row conductors of panel PP is barrier signal $e_{bar}$ generated by driver BVD. In addition, the only non-sustain signal applied to the odd-numbered, "display" row conductors is the positive half-select portion of the shifting write pulse SWR; all other pulses are applied in full to each display site of the panel by way of its column conductor. Whenever a shifting write pulse is to be applied to the sites in any one of columns C2, C3, C4, C5, etc., the signal on the corresponding one of leads W1, W2, W3 and W4 is extended to each row write driver RWD by way of OR gate 16 and an individual one of OR gates 17. Each row driver responds by extending pulse SWR to its associated row conductor, again by way of a gate SD.

When a shifting write pulse is to be applied to particular sites in column C2 to enter new display information onto the panel, the logic level signal on lead WO pulses not only driver C2D but also data buffer DB, the latter over lead 263. Buffer DB has a plurality of logic level output leads 268, each connected to a different one of row drivers RWD by way of a respective one of OR gates 17. The buffer responds to the signal on lead 263 by providing "0"s and "1"s on its output leads in accordance with the OFF and ON pattern to be presented in column C2. Since at this time only column C2 is receiving the shifting write pulse negative half-select signal SWC, the only sites affected by the signals from drivers RWD are those sites in column C2 which are to be switched ON.

When the display system of FIG. 1 is in its display (as well as its shifting) mode, circuit TC continuously provides the above-described timing signals on leads PSS and NSS to continuously generate the sustain signals necessary to maintain whatever sites are currently in the ON state in that state. At the same time, data buffer DB receives over lead 260 new information to be shifted onto the panel. Lead 260 may extend from a digital computer, for example, or other data processor. when shifting is to commerce, buffer DB provides a logic level "1" to timing circuit TC over lead 261. The latter, in response, begins to generate the sequence of logic level signals necessary to generate the pulse sequence of FIG. 4. Whenever the buffer is empty, the signal on lead 261 returns to "0". Circuit TC continues in the shifting mode through the next-occurring sustain cycle 10 or 20 and then stops. The system is thus returned to the display mode. (Although barrier signal $e_{bar}$ is needed, if at all, only when the display system is in its shifting mode, it is illustratively applied to the even-numbered rows at all times to simplify timing circuit TC.)

Figure 5:
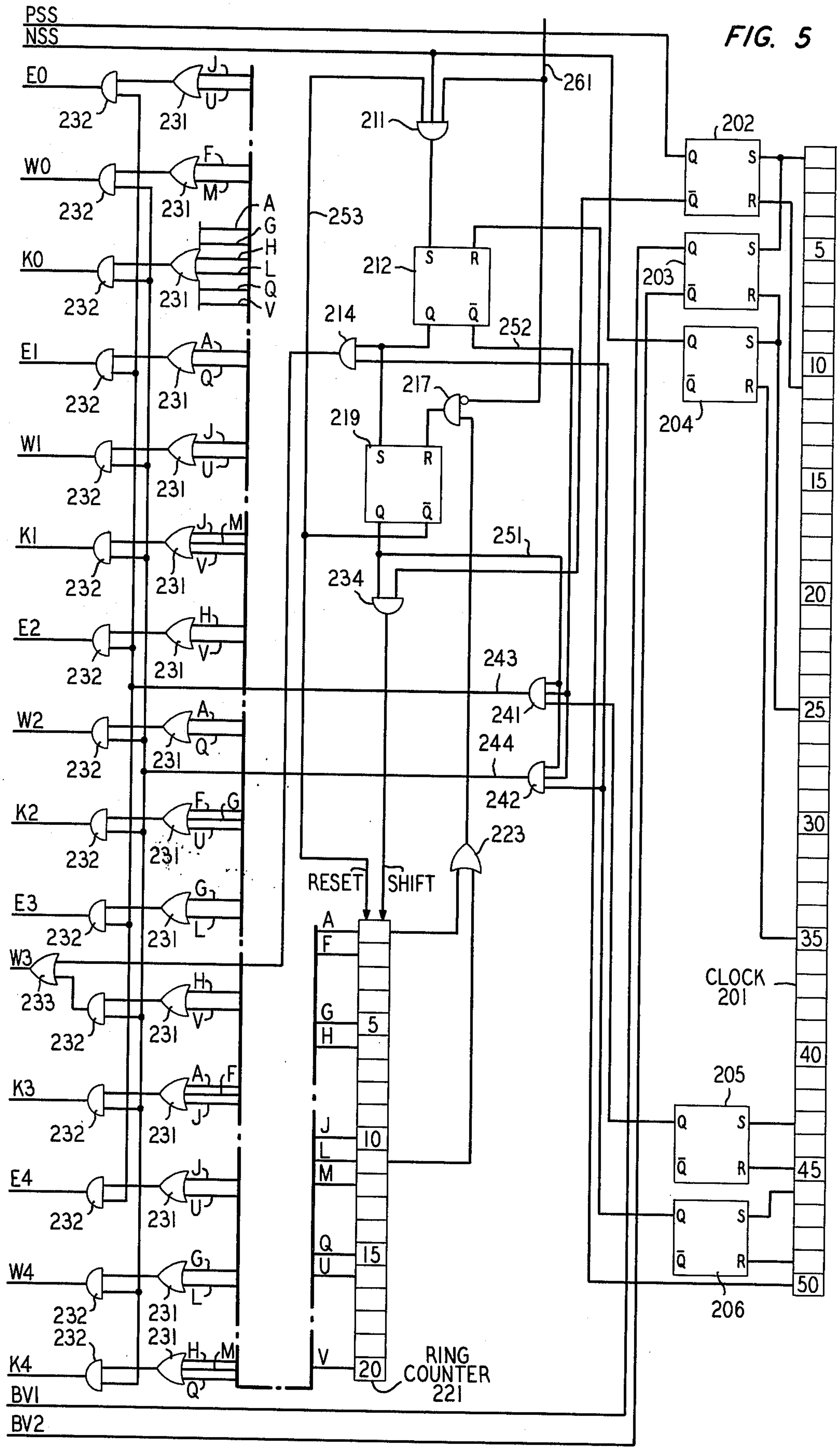
FIG. 5 is a block diagram of the timing circuit used in the display system of FIG. 1.

FIG. 5 depicts an illustrative embodiment of timing circuit TC. Circuit TC is controlled by a clock 201 having stages 1–50. At any given time, a "1" appears on the output lead of a single one of the stages of clock 201.

(Only the output leads of some of the stages are actually shown in FIG. 5.) That "1" is shifted from one stage to the next every 0.5 μsec and then back to stage 1. Clock 201 thus cycles through its stages once every 25.0 μsec, which is illustratively the length of one sustain cycle.

The output waveforms of timing circuit TC are generated by utilizing signals from various stages of clock 201 to control the states of set/reset flip-flops 202–206. For example, the 5.0 μsec positive sustain timing signal is generated at the Q output of flip-flop 202 and extended onto lead PSS by connecting the outputs of clock stages 1 and 11 to the set (S) and reset (R) inputs, respectively, of flip-flop 202. The signal on lead PSS thus becomes "1" at the beginning of each sustain cycle and returns to "0" 5.0 μsec later. The signals on leads BV1, NSS, and BV2 as well as timing signals defining the time periods within each sustain cycle for erase and shifting write signals, are similarly provided at the outputs of flip-flops 203–206, respectively. The flip-flop 206 timing signals are also used as timing signals for pulses SE and KP since the latter occur during the same time slot of each sustain cycle as shifting write pulse SW. When the display system is in its shifting mode, the output signals of flip-flops 205 and 206 are coupled through AND gates 241 and 242 to erase and shifting write timing leads 243 and 244, respectively, as will be described in detail hereinbelow.

Output leads E0-E4, W0-W4 and K0-K4 of timing circuit TC each comprise the output lead of a respective one of two-input AND gates 232. Each of the AND gates feeding leads E0, E1, E2, E3 and E4 receives one of its inputs from erase timing lead 243. Each of the AND gates feeding leads W0, W1, W2, W3, W4, K0, K1, K2, K3 and K4 receives one of its inputs from shifting write timing lead 244. The second input for each of gates 232 is received from a respective one of OR gates 231. Gates 231, in turn, receive their input signals from various stages of ring counter 221.

Counter 221 functions when the display system is in its shifting mode to define which sustain cycle of the twenty-cycle block of FIG. 4 is in progress. During sustain cycle 1, for example, the output of stage 1 of ring counter 221 is "1"; during cycle 2, the output of its stage 2 is "1"; and so forth. The output leads of counter stages 1, 2, 5, 6, 10, 11, 12, 15, 16 and 20 are designated, A, F, G, H, J, L, M, Q, U and V, respectively. Each of these leads serves as an input to one or more of OR gates 231. The interconnections between counter 221 and gates 231 are such that an OR gate receives an input "1" from counter 221 during each sustain cycle that the timing circuit output lead associated with that OR gate is scheduled to provide an output pulse. AND gates 232 are thereby enabled to couple the appropriate erase and shifting write timing signals on leads 243 and 244 to the timing circuit output leads.

When the display system is in its display mode, the signal on lead 261 from buffer DB is "0", and the Q and $\overline{Q}$ outputs of mode flip-flop 219 are "0" and "1", respectively. The "0" on output lead 251 of mode flip-flop 219 disables AND gates 241 and 242, thereby preventing the erase and shifting write timing signals generated by flip-flops 205 and 206 from reaching leads 243 and 244. Accordingly, leads E0-E4, W0-W4 and K0-K4 all remain quiescent.

Data buffer DB provides a "1" on lead 261 when data input and shifting are to begin. As a result, the next "1" occurring on lead NSS is coupled through AND gate 211 to the set input of flip-flop 212. The resulting "1" at the Q output of flip-flop 212 switches mode flip-flop 219 to the set state. The Q output of the latter becomes "1", indicating that the system is now in its shifting mode. The negative transition at the $\overline{Q}$ output of flip-flop 219 resets ring counter 221 to a configuration in which the signal on its lead V is "1" and the signals on all its other output leads are "0".

Since flip-flop 212 output lead 252 is now at "0", gates 241 and 242 are still prevented from coupling erase and shifting write timing signals to leads 243 and 244, even though the signal on mode flip-flop output lead 251 is now "1". However, the "1" at the Q output of flip-flop 212 enables AND gate 214 to couple the next shifting write timing signal at the output of flip-flop 207 through OR gate 233 to lead W3. This provides the timing signal necessary to generate the scan erase pulse of sustain cycle 0, as previously described.

The subsequent "1" at the output of clock stage 50 switches flip-flop 212 back to the reset state. Gates 241 and 242 are now enabled to pass erase and shifting write timing signals from flip-flops 205 and 206 through to leads 243 and 244. The $\overline{Q}$ output of flip-flop 219 is extended to one input of AND gate 211 via lead 253. That lead now carries a "0". Accordingly, flip-flop 212 remains in its reset state for the duration of the shifting sequence, inhibiting the generation of further scan erase pulses.

Since the signal on mode flip-flop output lead 251 is now at "1", the next negative transition at the $\overline{Q}$ output of flip-flop 202 at the start of the following sustain cycle creates a negative transition at the output of AND gate 224. This, in turn, causes the "1" on lead V of counter 221 to be shifted to lead A thereof, indicating that the system is now in sustain cycle 1. Since lead A extends to inputs of the OR gates 231 associated with output leads K0, W2 and K3, the shifting write timing signal on lead 244 is coupled through to these output leads during this first sustain cycle of the twenty-cycle block, as can be verified from FIG. 4. Lead A is also coupled to the OR gate associated with output lead E1 so that, in addition, the erase timing signal on lead 243 is coupled through to lead E1 during sustain cycle 1.

The "1" on lead A shifts to lead F at the start of sustain cycle 2, steering the shifting write timing signal to leads W0, K2 and K3, as can again be verified from FIG. 4.

Timing signal generation continues similarly through cycles 3–20 of this first block and then repetitively through cycles 1–20 of each subsequent twenty-cycle block.

Assume, now, that data buffer DB returns lead 261 to "0", indicating that shifting is to terminate. Shifting must continue, however, until the information on panel PP is displayed only at the odd-numbered columns of the panel. This configuration occurs twice during each twenty-cycle block—after cycle 10 and after cycle 20. These stopping points are signified during each twenty-cycle block by a "1" at the output of OR gate 223, which receives its inputs from stages 1 and 11 of counter 221. Since the signal on lead 261 is now "0", the next "1" at the output of gate 223 generates a "1" at the output of gate 217, resetting mode flip-flop 219. Gates 241 and 242 are thereby prevented from coupling any further erase or shifting write timing signals to leads 243 and 244. The shifting operation of counter 221 also ceases.

It will be appreciated that the specific embodiment of the invention shown and described herein is merely illustrative. For example, the particular signal waveforms described herein are those I have found useful in implementing the invention using an Owens-Illinois 512-60 DIGIVUE® plasma panel. However, these waveforms may be varied, depending upon the application.

For example, it may be found necessary to allow an additional sustain cycle to elapse between sustain cycle pairs 5/6, 10/11, 15/16 and 20/1 in each twenty-cycle block to ensure substantial collapse of the wall voltage at the sites being erased in cycles 5, 10, 15 and 20. Otherwise, depending on other signal parameters, enough wall voltage may remain at the erased site that the shifting write pulse applied to it in the next sustain cycle may switch the site to the ON state, even if it is to remain OFF. Consider, for example, site (3,9), which is ON in cycle 4 (Chart E of FIG. 3) and is erased in cycle 5 (Chart F), but is to remain OFF when a shifting write pulse is applied to it in cycle 6 (Chart G).

In addition, it should be understood that terms such as "row" and "column" are used herein merely as convenient references and may be interchanged, if done consistently. The terms "positive" and "negative" are to be regarded similarly.

Thus it will be appreciated that those skilled in the art will be able to devise many and varied arrangements embodying the principles of the present invention without departing from the spirit and scope thereof.

What is claimed is:

1. A gas discharge display system comprising at least a first row of at least first through fourth adjacent gas discharge display sites having ON and OFF states, each site comprising a volume of gas having an associated breakdown voltage $V_b$ and each adapted to store voltages across said volume of gas, sustain means for repetitively applying first- and second-polarity sustain signals of predetermined duration and magnitude $V_s < V_b$ alternately across each of said sites, said sustain signals causing a characteristic voltage of magnitude $V_m > (V_b - V_s)$ to be stored across a site which is in said ON state, a spread voltage $V_{ms} < (V_b - V_s)$ being stored across a site which is in said OFF state if it is immediately adjacent in said row to a site which is in said ON state, erase means for applying an erase signal across said first and third sites during first and second time intervals, respectively, each of said intervals being intermediate a respective one of said second-polarity sustain signals and the immediately succeeding, first-polarity sustain signal, and shifting write means for applying a shifting write signal across said second and fourth sites during said first and second intervals, respectively, said shifting write signal being of said first polarity and having a magnitude $V_{sw}$, $(V_b - V_{ms}) < V_{sw} < V_b$.

2. The invention of claim 1 further comprising a plurality of column conductors each associated with a different site of said row and at least a first row conductor associated with all of the sites in said row, said shifting write means comprising means for applying said shifting write signal across an individual one of said sites by applying first and second portions thereof to the column and row conductors associated with said individual site, the magnitude of said second portion being $V_{swr}$.

3. The invention of claim 2 further comprising means for applying a canceling signal to the column conductors associated with said third and second sites when a shifting write pulse is being applied to said second and fourth sites, respectively, each said canceling signal being of a magnitude $V_k > (V_m + V_{swr} - V_b)$.

4. The invention of claim 1 further comprising means for applying a scan erase signal to said third site prior to said first interval, said scan erase signal operating when said third site is in the ON state to reduce the voltage stored thereat to a level which is less than $V_m$.

5. The invention of claim 4 further comprising a fifth discharge site adjacent in said row to said first site and a sixth site adjacent in said row to said fifth site, means for maintaining said sixth site in the ON state, means for applying an erase signal and a shifting write signal to said fifth and first sites, respectively, during a third interval subsequent to said second interval, and means for applying a shifting write signal to said fifth site at a time prior to said third interval.

6. Circuitry for use in a display system which includes a twin-substrate ac plasma panel and in which first- and second-polarity sustain signals applied alternately across the discharge sites of said panel maintain a characteristic level of charge stored at ON sites thereof, at least a predetermined amount of the charge stored at each ON site spreading to each OFF site adjacent thereto, said circuitry comprising erase means for applying an erase pulse across a first site of said panel during a first time interval, said first time interval being subsequent to a first one of said second-polarity sustain signals and prior to the immediately succeeding first-polarity sustain signal, and shifting write means for applying a shifting write pulse across a second, OFF site of said panel during said first time interval, said second site being immediately adjacent in said panel to said first site, said shifting write pulse being of said first polarity and having a magnitude and duration such that said shifting write pulse causes to be stored at said second site an initial level of charge sufficient to establish said second site in the ON state only if an amount of charge at least as great as said predetermined amount has spread to said second site, whereby the state of said first site is transferred to said second site.

7. The invention of claim 6 wherein said shifting write pulse is initiated subsequent to the initiation of said erase pulse and wherein said shifting write pulse terminates prior to the succeeding first-polarity sustain signal by a predetermined time interval, said predetermined time interval being less than the recovery time associated with said shifting write pulse but being sufficiently great that said initial level of charge is substantially less than said characteristic level.

8. The invention of claim 7 wherein said erase means includes means for applying an erase pulse across a third site of said panel during a second time interval, said third site being immediately adjacent said second site, said second time interval being subsequent to a second one of said second-polarity sustain signals and prior to the immediately succeeding first-polarity sustain signal, and wherein said shifting write means includes means for applying said shifting write pulse across a fourth site of said panel during said second time interval, said fourth site being immediately adjacent said third site.

9. The invention of claim 8 wherein said circuitry further comprises means for applying a scan erase pulse across said third site prior to said first interval, said scan erase pulse operating when said characteristic level of charge is stored at said third site to reduce the level of charge stored thereat to below said characteristic level.

10. The invention of claim 9 wherein said shifting write means includes means for applying a first portion of said shifting write pulse across said second and fourth sites during said first and second intervals, respectively, and for applying a second portion of said shifting write pulse across all of said sites during both said first and second intervals, said circuitry further comprising means for applying a canceling pulse across said second and third sites in coincidence with the application of said shifting write pulse to said fourth and second sites, respectively, the polarity of said canceling pulse being such as to reduce the net voltage across the sites across which it is applied.

11. The invention of claim 10 wherein said second portion of each said shifting write pulse is of substantially the same magnitude as said erase pulse.

12. a gas discharge display system comprising
first and second dielectric layers,
a body of ionizable gas between said layers,
first and second sets of conductors embedded in said first and second dielectric layers, respectively, individual overlappings of each first set conductor with a plurality of said second set conductors defining respective rows of discharge sites and individual overlappings of each second set conductor with a plurality of said first set conductors defining respective columns of discharge sites, each site having a breakdown voltage $V_b$,
means for interconnecting a plurality of said columns in first through fourth interleaved groups, and
signal means including said first and second sets of conductors for applying predetermined signals to said sites,
said signal means comprising
means for applying a periodic sustain signal across said sites, each cycle of said sustain signal comprising a first-polarity pulse followed by a first time interval followed by a second-polarity pulse followed by a second time interval, said pulses being of predetermined duration and of magnitude $V_s < V_b$, said sustain signal causing an alternating-polarity signal of magnitude $V_m > (V_b - V_s)$ to be stored at sites of said array which are in the ON state, an alternating-polarity signal of magnitude $V_{ms} < (V_b - V_s)$ being stored at a site not in said ON state if an immediately adjacent site in the same row is in the ON state,
means for applying an erase pulse across the sites in said first and third groups of columns during first and second cycles, respectively, of said sustain signal, and
means for applying a shifting write pulse across the sites in said second and fourth groups of columns during said first and second sustain cycles, respectively, said erase and shifting write pulses being of said first polarity and each occurring during the second time interval of their respective sustain cycles, each shifting write pulse having a magnitude $V_{sw}$, $(V_b - V_{ms}) < V_{sw} < V_b$.

13. The invention of claim 12 further comprising a third set of conductors interleaved between said first set conductors and means for applying a barrier signal to each conductor of said third set, said barrier signal having said first polarity during said first polarity pulse and said first time interval of each sustain cycle and having said second polarity during said second-polarity pulse and said second time interval of each sustain cycle.

14. The invention of claim 12 wherein each erase pulse is initiated prior to the shifting write pulse applied during the same sustain cycle and wherein each shifting write pulse terminates prior to the succeeding first-polarity sustain pulse by a time interval which is less than the recovery time associated with said shifting write pulse.

15. The invention of claim 14 further comprising means for applying a scan erase pulse to the sites in said third group of columns prior to said first cycle, said scan erase pulse reducing the voltage of all ON sites in the columns of said third group to a level substantially below $V_m$.

* * * * *